US010069749B1

(12) United States Patent
Narkier et al.

(10) Patent No.: US 10,069,749 B1
(45) Date of Patent: Sep. 4, 2018

(54) METHOD AND APPARATUS FOR DISAGGREGATED OVERLAYS VIA APPLICATION SERVICES PROFILES

(71) Applicant: EMC Corporation, Hopkinton, MA (US)

(72) Inventors: Sheppard David Narkier, Charlotte, NC (US); Kenneth Durazzo, San Ramon, CA (US); Stephen J. Todd, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 275 days.

(21) Appl. No.: 14/584,231

(22) Filed: Dec. 29, 2014

Related U.S. Application Data

(60) Provisional application No. 62/054,125, filed on Sep. 23, 2014.

(51) Int. Cl.
*G06F 15/173* (2006.01)
*H04L 12/911* (2013.01)
*H04L 29/08* (2006.01)

(52) U.S. Cl.
CPC .............. *H04L 47/70* (2013.01); *H04L 67/30* (2013.01)

(58) Field of Classification Search
CPC .................................. H04L 47/70; H04L 67/30
USPC .......................................................... 709/226
See application file for complete search history.

(56) References Cited

U.S. PATENT DOCUMENTS

| | | | |
|---|---|---|---|
| 2004/0264112 A1* | 12/2004 | Koehler | H05K 7/1457 361/600 |
| 2011/0145657 A1* | 6/2011 | Bishop | G06F 11/3495 714/47.1 |
| 2013/0097304 A1* | 4/2013 | Asthana | H04L 41/5025 709/224 |
| 2013/0346614 A1* | 12/2013 | Baughman | G06F 9/5083 709/226 |
| 2014/0075004 A1* | 3/2014 | Van Dusen | H04L 41/04 709/223 |
| 2014/0181472 A1* | 6/2014 | Krig | G06F 9/3897 712/201 |
| 2015/0372426 A1* | 12/2015 | Maier | H01R 24/62 439/676 |

* cited by examiner

*Primary Examiner* — S M Rahman
(74) *Attorney, Agent, or Firm* — Ryan, Mason & Lewis, LLP

(57) ABSTRACT

Example embodiments of the present invention relate to a method, a system, and a computer program product for creating a dynamically composed compute node. The method includes receiving an application characteristic and generating an infrastructure allocation request according to the application characteristic. The infrastructure allocation request then may be forwarded to a management system associated with a disaggregated infrastructure.

21 Claims, 18 Drawing Sheets

| FCN'L PATTERN COMPONENT | FUNCTIONAL SERVICE PROFILE |||||||||
|---|---|---|---|---|---|---|---|---|---|
| | UNIT OF WORK ATTRIBUTES || UNIT OF WORK EFFECT ON... |||| VARIABILITY OF USAGE ON... ||||
| | APPEARANCE | APPORTIONMENT ACR. INSTANCES | CPU | MEM. | DISK I/O | NTWK I/O | CPU | MEM. | DISK I/O | NTWK I/O |
| MESSAGE GATEWAY | HIGH | HIGH | LOW | LOW | LOW | HIGH | FLUCTU- ATING | STATIC | STATIC | STATIC |
| ... | ... | ... | ... | ... | ... | ... | ... | ... | ... | ... |

FIG. 13

| WORKLOAD PATTERN CHARACTERISTICS OF BUSINESS VALUE CHAIN LINKS ||
|---|---|
| MARKET CONTEXT PROCESSING | OUTBOUND LOGISTIC PROCESSING |
| – DATA FLOW MODEL - LAYERED PEER TO PEER STRUCTURES - CASCADING FLOW OF INPUT AND STATE; PUB/SUB; MANY TO ONE - FILTERING AND ROUTING<br>– CALL CENTER SYSTEMS (INBOUD AND OUTBOUND)<br>– AUTOMATED MARKET INFORMATION (E.G., STOCK PRICES, INTEREST RATES)<br>– MARKETING CAMPAIGN INFORMATION SYSTEM (E.G., MARKET INTELLIGENCE INFO, LEADS GENERATION) | – GOING OUTSIDE OF COMPANY, EXTRANETS<br>– PROTOCOL GATEWAYS, DATA CONVERSIONS<br>– STORE AND FORWARD<br>– RECONCILIATION PROCESS<br>– COMPLEX TRANSACTIONS<br>– SECURITY, CONFIDENTIALITY<br>– NON-REPUDIATION<br>– MULTI-PHASE COMMIT |
| TRANSACTION PROCESSING | INBOUND LOGISTICS PROCESSING |
| – N-TIER STRUCTURE, SHORT LIVED TRANSACTIONS (ALWAYS FINANCIAL)<br>– ORDER ENTRY<br>– POS<br>– CUSTOMER SERVICE REQUESTS | – COMING INSIDE TO COMPANY<br>– SECURITY, VALIDATION<br>– PROTOCOL & DATA DATA CONVERSIONS<br>– LOGGING |
| SUPPORT PROCESSING | ANALYSIS A& REPORTING |
| – CLIENT-SERVER STRUCTURE, N-TIER, LONG LIVED TRANSACTIONS (RARELY FINANCIAL)<br>– DISPATCHING SYSTEMS<br>– DELIVERY SYSTEMS<br>– MAINTENANCE SYSTEMS | – AGGREGATION AND LARGE FAN OUT, NORMALIZATION AND ANALYSIS, RENDERING, AND DISTRIBUTION - SIMILAR TO DATA PROC/INTEG; LOTS OF DATA MARTS, SATELLITE REPOSITORIES, TIES IN WORKFLOW/COLLAB<br>– BUSINESS INTELLIGENCE<br>– OPERATIONS RESEARCH |
| DATA PROCESSING & INTEGRATION | WORKFLOW & COLLABORATION |
| – EAI STRUCTURES, DATA AGGREGATION/RATIONALIZATION/INTEGRATION, BATCH PROCESSING, CLUSTERED MODELS, MANY-TO-MANY, LARGE SHARED DBS<br>– ETLS<br>– MESSAGE BUS | – DISTRIBUTED WORKFLOW MANAGEMENT<br>– DATA & MEDIA DISTRIBUTION<br>– CONTROLLER<br>– REPOSITORIES<br>– CACHES |

FIG. 14

METHOD AND APPARATUS FOR DISAGGREGATED OVERLAYS VIA APPLICATION SERVICES PROFILES

CROSS REFERENCE TO RELATED APPLICATION

This Application claims the benefit of U.S. Provisional Patent Application Ser. No. 62/054,125 entitled "METHOD AND APPARATUS FOR DISAGGREGATED OVERLAYS VIA APPLICATION SERVICES PROFILES" filed on Sep. 23, 2014, the teachings of which application are hereby incorporated herein by reference in their entirety.

This Application is related to U.S. patent application Ser. No. 12/973,599 entitled "INFRASTRUCTURE CORRELATION ENGINE AND RELATED METHODS" filed on Dec. 20, 2010; and Ser. No. 14/318,805 entitled "APPLICATION AND INFORMATION MOVEMENT IN A CLOUD ENVIRONMENT", Ser. No. 14/319,819 entitled "SOFTWARE OVERLAYS FOR DISAGGREGATED COMPONENTS", Ser. No. 14/318,831 entitled "CLOUDBOOK", and Ser. No. 14/319,773 entitled "MIGRATING PRIVATE INFRASTRUCTURE SERVICES TO A CLOUD", Ser. No. 14/320,001 entitled "CONTENT FABRIC FOR A DISTRIBUTED FILE SYSTEM", and Ser. No. 14/320,069 entitled "DYNAMICALLY COMPOSED COMPUTE NODES COMPRISING DISAGGREGATED COMPONENTS" filed on Jun. 30, 2014, the teachings of which applications are hereby incorporated herein by reference in their entirety.

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates generally to computer platforms, and more particularly to systems and methods for creating dynamically composed compute nodes from disaggregated hardware components.

BACKGROUND

Information technology infrastructures have evolved. Early infrastructures comprised thin-clients in communication with a mainframe. The mainframe included hardware resources that were shared by all the clients in the infrastructure. These infrastructures may be referred to as "first platform."

Mainframes eventually lost popularity to general-purpose personal computers and/or servers. These computers include hardware components bundled together into a single sheet metal box, and are commonly used as building blocks for more complex systems. These infrastructures may be referred to as "second platform."

Currently there is a trend away from mainframes, personal computers, and servers to a new, third platform infrastructure. Third platform infrastructures may be summarized by at least five trends: mobility, social, big data, cloud, and trust.

There is a need, therefore, for an improved method, article of manufacture, and apparatus for allocating hardware resources to third platform infrastructures.

SUMMARY

Example embodiments of the present invention relate to a method, a system, and a computer program product for creating a dynamically composed compute node. The method includes receiving an application characteristic and generating an infrastructure allocation request according to the application characteristic. The infrastructure allocation request then may be forwarded to a management system associated with a disaggregated infrastructure.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every Figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

FIG. 13 is a table illustrating functional service profiles according to an example embodiment of the present invention;

FIG. 14 is a table illustrating workload pattern characteristics for business value chain links according to an example embodiment of the present invention;

DETAILED DESCRIPTION

The methods, processes, and systems described herein enable disaggregated hardware resources and/or components to be combined into a dynamically composed compute node (also referred to herein as a "DCCN" or "compute node"). Traditional infrastructures comprise hardware components that are preassembled inside of an enclosure. These infrastructures are commonly scaled out on an enclosure basis, and are often divided between storage servers and compute/memory servers. Traditional infrastructures do not, however, scale well in a cloud environment. They are bounded by the number of servers in the environment and the server capacity. To increase an environment's resources, new components or enclosures must be physically added, consuming time and adding cost. The methods, systems, and processes discussed herein alleviate these concerns by providing a mechanism for combining disaggregated hardware components into a DCCN.

Figure 1:
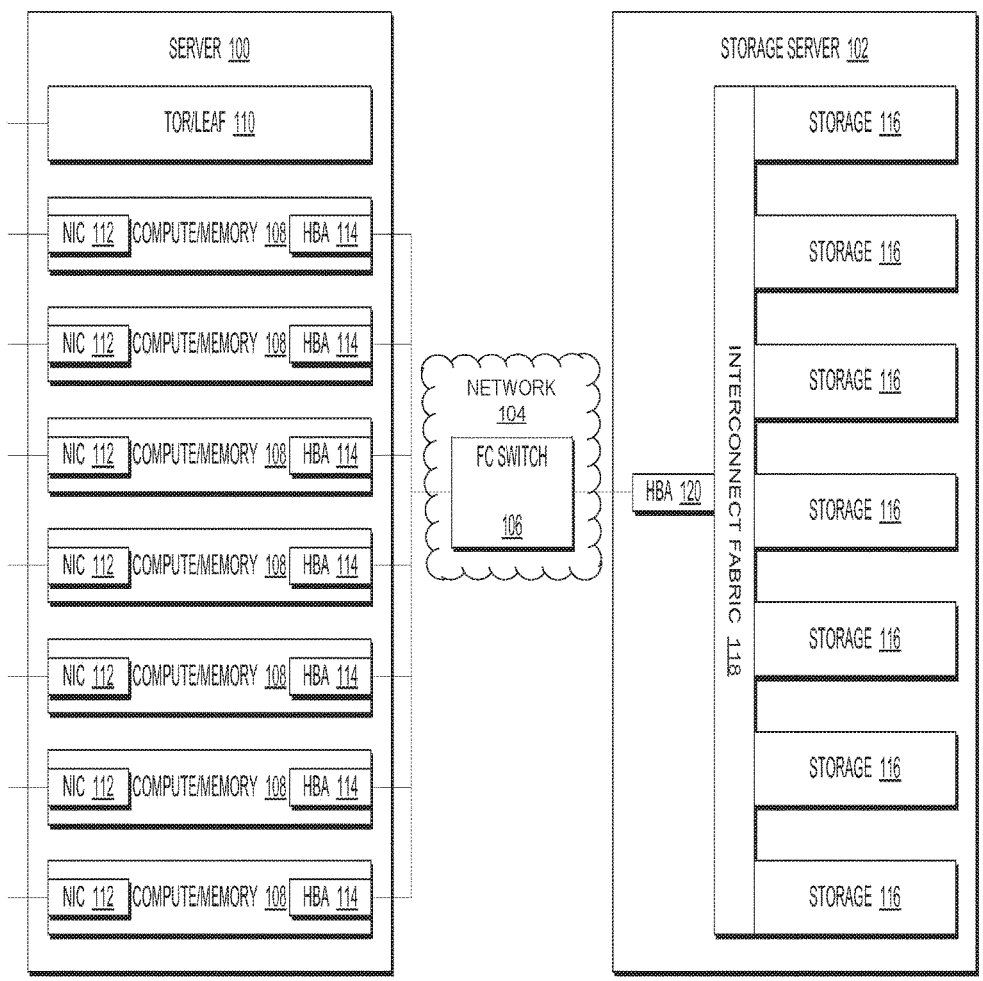
FIG. 1 is a block diagram illustrating a traditional infrastructure according to an example embodiment of the present invention.

FIG. 1 is a block diagram of a traditional infrastructure according to an example embodiment of the present invention. Unlike the systems discussed in reference to FIG. 2 et seq., the system shown in FIG. 1 may be purpose built for a given entity or application. The system may comprise server 100 and storage server 102 in communication with each other over network 104. In an embodiment, network 104 may comprise fiber channel connected through fiber channel switch 106.

Server 100 may comprise compute and/or memory resources 108 in communication with top-of-rack ("TOR") switch 110 via Network Interface Controllers ("NIC") 112. Compute/memory resources 108 may interface with network 104 through Host Bus Adaptors ("HBA") 114. In an embodiment, computer server 100 primarily comprises processing resources, such as computer memory or processors, and contains limited storage resources.

Storage server 102 may comprise storage resources 116 connected by interconnect fabric 118. In an embodiment, storage server 102 may be part of a storage area network ("SAN"). Storage resources 116 could be, for example, tape or spinning-disk resources. Storage server 102 may further comprise storage processor 120 in communication with interconnect 118. HBA 120 may interface with network 104, allowing data to be received from or transmitted to server 100.

The traditional infrastructure of FIG. 1 presents numerous challenges. First, the constituent hardware components are typically bundled together by type inside of an enclosure, such as a server rack. For example, server 100 may comprise compute/memory resources 108 and TOR switch 110 bundled inside of a single machine. Similarly, storage server 102 may comprise storage resources 116 bundled together inside of a machine. Adding additional resources may therefore require physically adding new enclosures or components, resulting in system downtime and/or expense.

Second, traffic flow in traditional infrastructures may be characterized as north-south ("N-S"), meaning I/O primarily flows from server 100 southwards through network 104 to storage server 102. Server 100 may be bound to storage server 102 in this N-S fashion, creating a siloed environment. As a result, a fully utilized server group cannot spill-over and consume resources from a separate, underutilized siloed environment. Similarly, data services such as snap copy, disaster recovery, and/or backup cannot be shared between the siloed environments. Instead, each siloed environment must comprise its own instance of these high-availability/resilience models.

The N-S dataflow also presents latency and communication issues. For example, communication within the infrastructure may require multiple hops and intercepts along the N-S data path. These hops may result from the different layers and protocols required for communication between the hardware components. For example, data may be processed by a compute/memory resource 108, transmitted over network 104 using HBA 114 and Fiber Channel Switch 106, received by storage processor 120 and communicated to storage 116 via interconnect 118. Each of these communications may use different protocols, thereby increasing overhead, management complexity, and troubleshooting complexity. The latency issues may be further exasperated for out of rack requests since the TOR connectivity may be separate from the compute to storage connectivity.

Persistent data services, such as snap, deduplication, or replication, are also limited within the traditional infrastructure. These data services may be limited to storage server 102 and unavailable at server 100. Applications wishing to store persistent data at server 100 are therefore not privy to these services, potentially resulting in data loss or corruption. Alternatively, the data services may exist independently on both storage server 102 and server 100, but have disparate implementations.

Figure 2:
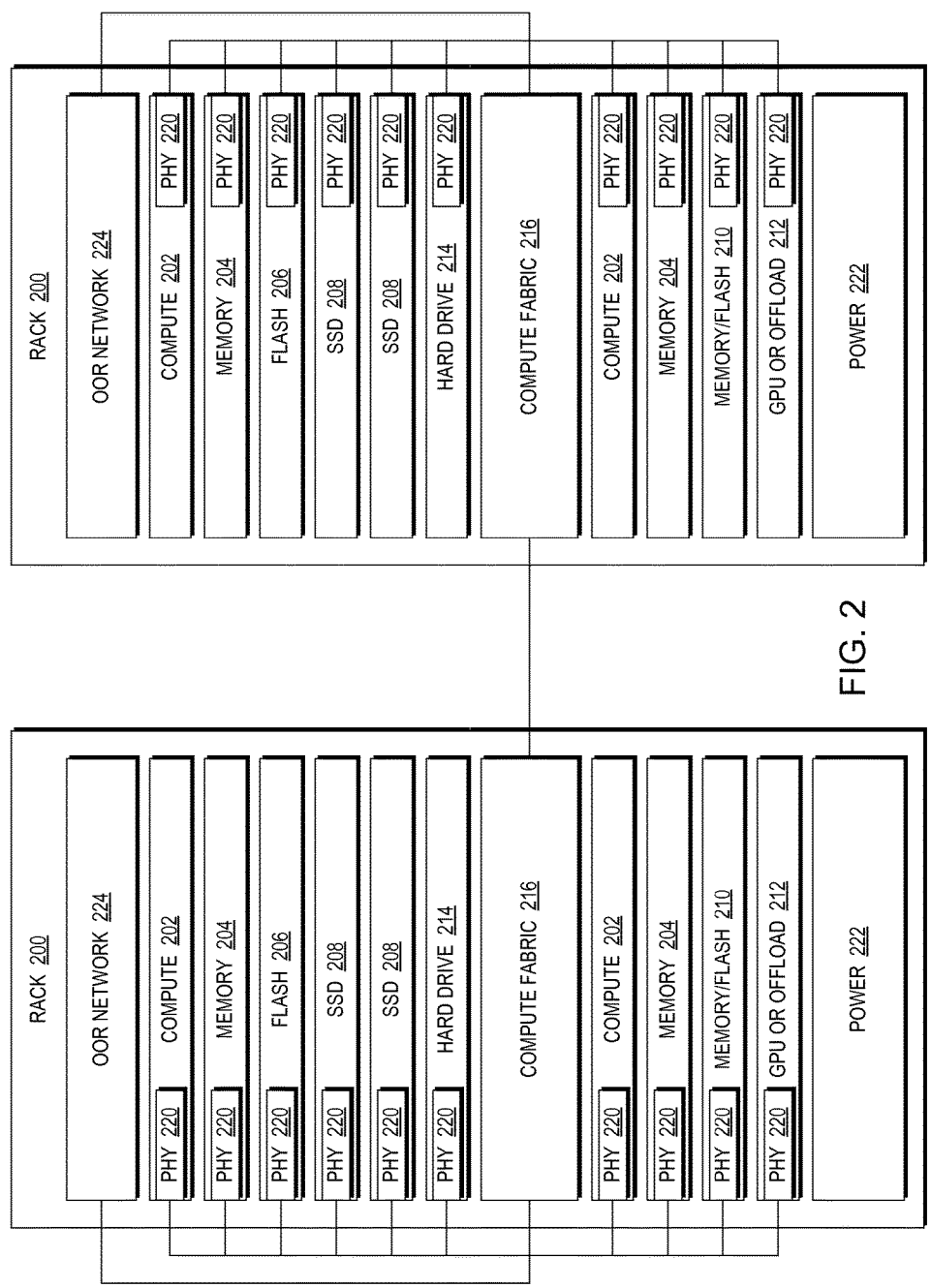
FIG. 2 is a block diagram illustrating a disaggregated infrastructure according to an example embodiment of the present invention.
Figure 3:
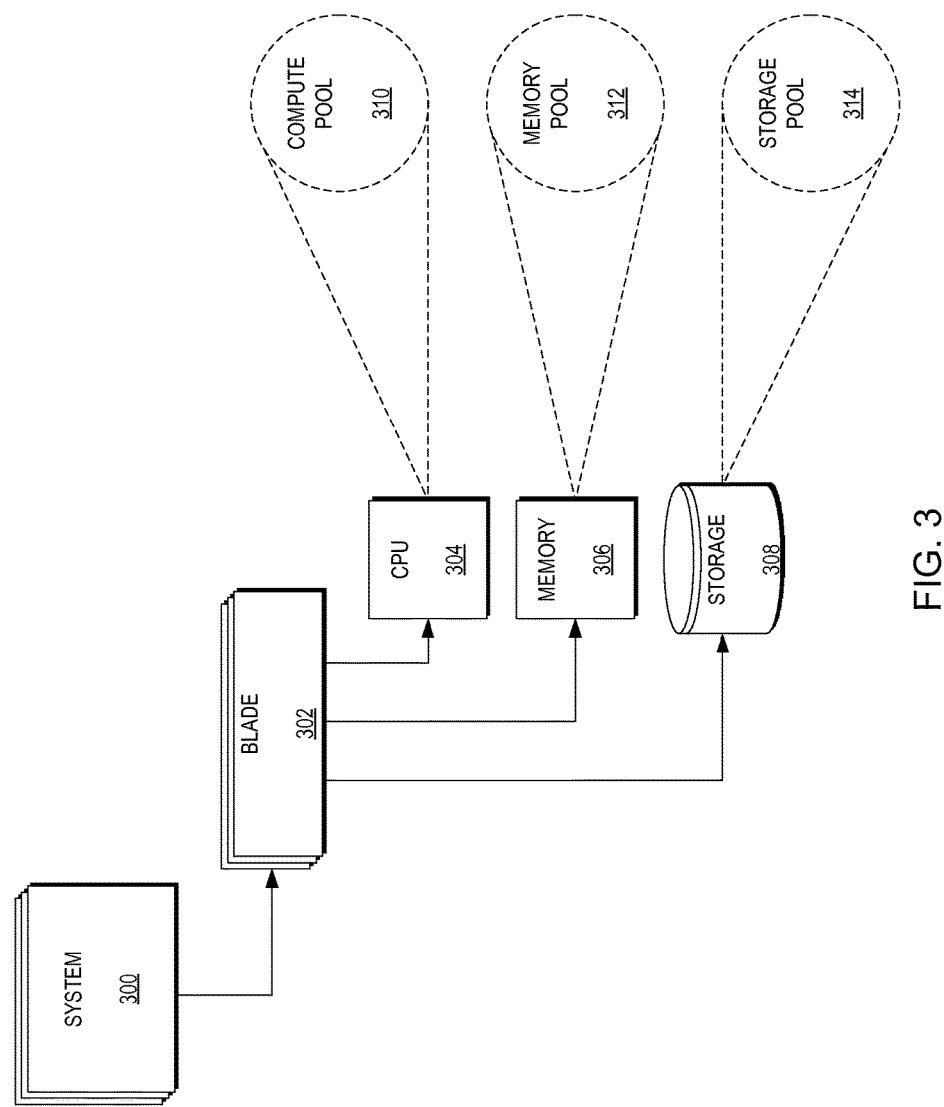
FIG. 3 is a block diagram illustrating logical resource pools according to an example embodiment of the present invention.

The disaggregated infrastructure depicted in FIGS. 2 and 3 addresses the limitations of traditional infrastructures. In FIGS. 2 and 3, hardware components may be disaggregated from their enclosures and combined together into logical pools of resources. Different components may be dedicated from these pools to specific applications and/or entities to form a dynamically composed compute node, and may be dynamically added or removed from this compute node as needed. This is unlike traditional infrastructures that are typically purpose built for specific applications. This may also be unlike traditional cloud-based services which pool and allocate virtual resources rather than physical resources.

For example, FIG. 2 depicts two separate racks 200 comprising various hardware components. These components include compute components (e.g., processors) 202, memory 204, flash 206, solid state drive ("SSD") 208, flash memory 210, graphics processing unit 212, and hard drive 214. These components may be in communication with each other via compute fabric 216, which may be accessed through physical ("phy") interfaces 220. In an embodiment, compute fabric 216 stretches across all the racks in the disaggregated infrastructure. This allows the hardware components to communicate directly with one another via the compute fabric, regardless of whether they are on the same rack. This compute fabric enables East-West ("E-W"), or server-to-server, communication. Racks 200 also include power supplies 222 and out of rack ("OOR") network interface 224.

The components shown in FIG. 2 are provided as a non-limiting example. For example, racks 200 may include additional hardware components that are not depicted. Similarly, racks 200 may comprise fewer components than are depicted. Additionally or alternatively, one rack may be dedicated to a specific type of component while another rack is dedicated to a different type.

FIG. 3 depicts an example embodiment of hardware resources from multiple systems combined into logical pools. The disaggregated infrastructure may include multiple systems 300 comprising hardware components in communication over a compute fabric, such as compute fabric 216. In an embodiment, systems 300 may be substantially similar to racks 200, and in some embodiments may comprise blade enclosures. Individual systems 300 may comprise one or more blades 302, which include compute ("CPU") resources 304, memory ("MEM") resources 306, and storage resources 308.

CPU 304, MEM 306, and storage 308 may be combined and logically associated with compute pool 310, memory pool 312, and storage pool 314 (collectively, "resource pools"). In an embodiment, these resource pools may include all of the resources of the designated type within the disaggregated infrastructure. For example, compute pool 310 may include every compute resource 304 on every system 300 in the disaggregated infrastructure. Similarly, memory pool 312 may include every memory resource 306 on every system 300 in the disaggregated infrastructure. With reference back to FIG. 2, for example, each compute component 202 may belong to the same compute pool, and each memory resource 204 may belong to the same memory pool, regardless of which rack 200 those resources are located in. In other words, the disaggregated hardware components spread between multiple systems in the disaggregated infrastructure may be logically associated with a set of resource pools.

The resources may be pooled together based on any common attribute. For example, all the solid state drives may be grouped into a SSD pool, and all the spinning disk resources may be grouped into a spinning disk pool. Similarly, pools may have sub-pools. For example, the storage pool may have an SSD sub-pool and a spinning disk sub-pool. In an embodiment, pools and sub-pools may be managed using nested views, as discussed in detail below.

The disaggregated hardware components associated with the resource pools may be combined to form a new dynamically composed compute node. This compute node may comprise one or more dedicated hardware components that may be dynamically allocated to a given task. For example, a user may request resources to install an operating system comprising a specific software application. That user may be allocated dedicated compute, memory, network, and storage resources from the pools to operate the OS and application.

In some embodiments, resource allocation may be performed by a management utility or service. The management utility may have visibility into the systems and resource pools, and may be configured to receive requests from a user. In an embodiment, the management utility resides on a system outside of the disaggregated infrastructure, on a DCCN inside the disaggregated infrastructure, or some combination thereof. As discussed below, the management utility may perform many additional functions.

Figure 4:
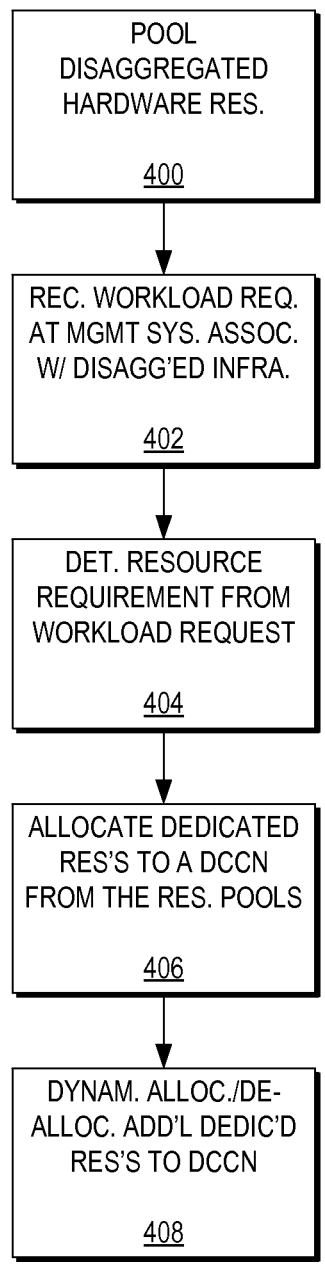
FIG. 4 is a flow diagram illustrating a method for creating a dynamically composed compute node according to an example embodiment of the present invention.

FIG. 4 depicts a process for creating a dynamically composed compute node from disaggregated hardware components. Disaggregated hardware resources may be pooled together into a resource pool (400). This resource pool could be, for example, substantially similar to compute pool 310, memory pool 312, and/or storage pool 314. The resource pool may comprise all the resources of a given type in a disaggregated infrastructure. Additionally or alternatively, a given resource type may be divided between multiple pools. For example, storage resources may be divided between a primary storage pool and a secondary storage pool. The primary storage pool may contain resources reserved for specific users or processes, while the secondary resource pool may be a general-purpose pool.

A workload request may be received at a management utility associated with the disaggregated infrastructure (402). The workload request may be any communication containing a request, instruction, or resource requirements for a dynamically composed compute node. For example, the workload request may be received from a user and may specify hardware requirements for a compute node. Additionally or alternatively, the workload request may include a request for software the user would like to install on a compute node. The management utility receiving the request may be substantially similar to the management utility discussed above. In an embodiment, the management utility has visibility into all of the resource pools in the system. The management utility may know which hardware components are being used and whom they are allocated to.

A resource requirement is determined from the workload request (404). If the workload request included resource requirements, they may be extracted from the request. If the workload request included a request for software, the management utility may consult a catalog or other entity to determine minimum and/or optimal resource requirements for that software.

Resources may be allocated to a dynamically composed compute node from the resource pools (406). The compute node may include hardware components residing on one or more systems in the disaggregated infrastructure. For example, the resources may reside on two separate racks and communicate over a compute fabric, such as compute fabric 216. The allocated resources may be presented to the requester as a computer, and may include compute, memory, network, and storage resources. In an embodiment, the resources are dedicated to the requestor and not shared with any other tasks, users, or compute nodes. For example, a requestor may request four CPU cores, 1 TB of storage, and 10 GB of RAM. That requestor may be allocated the requested physical resources, and those resources may not be shared with anyone else.

Resources may be dynamically allocated or de-allocated from the DCCN (408). For example, the management utility may receive a second request for additional resources. Based on the second request, the management utility may allocate additional dedicated resources to the compute node. Similarly, resources may be de-allocated from the compute node and placed back into the resource pool. In some embodiments, the management utility may monitor the compute node's health and dynamically allocate or de-allocate resources as necessary. For example, additional storage resources may be dynamically added to a compute node that is approaching storage capacity. Similarly, if a compute node never consumes more than half its allocated memory, memory resources may be de-allocated.

The dynamically composed compute nodes discussed in reference to FIGS. 2-4 may provide numerous benefits over traditional infrastructures. These benefits may include data service availability, reduced latency, dynamic resource allocation and de-allocation, increased power efficiency and management, and improved monitoring capabilities. Each of these benefits is discussed in turn.

The dynamically composed compute nodes improve data service availability by distributing the services beyond the traditional siloed systems. Data services traditionally operate within a storage server or SAN, such as storage server 102, and are unavailable to a compute server, such as server 100. Applications operating at the compute server that store persistent data in local storage are therefore not privy to these services. The present dynamically composed compute nodes, in contrast, allow persistent data to be accessed directly through the compute fabric by any component in a manner that is consistent for all components. This allows data services to be applied to any data in the system, rather than just data stored on a storage server. For example, RAM pages may be written to persistent storage while an application is executed. Traditionally, these pages are not privy to data services because they are written to storage on the compute server. In a dynamically composed compute node, however, these pages may be written to storage that is accessible through the compute fabric, and may therefore benefit from data services that would otherwise only be available to persistent data on a storage server. The RAM pages could be, for example, deduplicated to conserve space.

The dynamically composed compute nodes also minimize latency with respect to both out-of-rack traffic and in-fabric communication. Out-of-rack traffic may be received and communicated directly to the compute fabric where it is routed to the appropriate components. Similarly, the disaggregated components within the system may communicate directly with each other over the compute fabric. This reduces the number of hops, intermediaries, and protocols involved in the communication, thereby improving efficiency.

Extending the power system across all of the disaggregated hardware components may enhance power efficiency and management. Different components may be allocated more or less power based on the workload they are executing. Components that are not being used may not receive any power until they are allocated to a DCCN. In an embodiment, power requirements may be specified in the workload request similar to other resource requirements. Additionally or alternatively, they may be dynamically determined based on the software and/or components specified in the workload request.

The disaggregated hardware components may be monitored from the management utility using in-band and/or out-of-band monitoring. This monitoring allows the management utility to provide point-in-time information about the components and their utilization. Based on this information, components may be reallocated to different compute nodes to improve performance and efficiency. For example, the management utility may use the monitoring information to identify available resources for a given workload request, or identify an optimal resource for an existing DCCN. The utility may then allocate those resources to the DCCN.

An embodiment of the present disclosure comprises in-band monitoring on the compute fabric. The management utility may be in communication with fabric busses that are used by a given DCCN during operation. The utility may monitor the busses to gather information about the performance and utilization of the constituent components. Similarly, the management utility may issue configuration commands, such as instructions to allocate specific resources, over the compute fabric. In an embodiment, the management utility passively monitors the busses for information. Additionally or alternatively, the management utility may poll the hardware components or resource pools to retrieve the desired information.

In some embodiments, in-band monitoring allows the management utility to discover newly added hardware components. These components may broadcast their presence when they are connected to the fabric, and/or the management utility may periodically poll all of the components connected to the fabric to identify new resources.

Additionally or alternatively, an embodiment of the present disclosure may comprise out-of-band monitoring. Individual components in the disaggregated infrastructure may include a management port for locally gathering statistics and sending them out-of-band to the management utility. Similarly, configuration information and/or instructions may be transmitted to the management port rather than over the fabric busses. Configuration modifications may be sent to the management port using telnet, ssh, or the like. Out-of-band monitoring may be beneficial if component operations are saturating the fabric, or if the fabric is otherwise unavailable.

Some embodiments may include both in-band and out-of-band monitoring. In-band monitoring may be used when the compute fabric is available or unsaturated. Out-of-band monitoring may be used as a backup, and the management utility may dynamically switch between the two based on fabric saturation, availability, or the like.

The monitoring capabilities may also provide nested views of different elements, components, and information within the disaggregated infrastructure. The systems and components in the disaggregated infrastructure may be divided into layers for greater transparency and control. For example, a bottom layer may contain information about specific hardware resources on a given blade in a box. A next layer may describe the current status or inventory of the box, such as which blades or line cards are in the box, and may embody the information contained in the bottom layer. A top layer may describe the inventory and status of all the boxes in a disaggregated infrastructure, and may include information from both the mid and the bottom layers. In this manner, different views may be nested within each other to provide varying levels of granularity. A user or management utility may desire information about the general health of the disaggregated infrastructure, and therefore only extract information from the topmost layer. Additionally or alternatively, the user or management utility may desire information about components operating on a given blade in a specific box, and may drill down through the nested views to acquire the desired information.

Views may be based on any type of quantifiable information about components or sub-components within the disaggregated infrastructure. For example, one view may be a line card utilization view. Another may be based on connection speeds, feeds, or other port information for individual blades in a box. This port information may then be aggregated together on a per-box basis to provide a second level view, and then summarized at a top level to provide an overview for the entire disaggregated infrastructure. Other information used to create one or more views may include forwarding constructs for the compute fabric, connected nodes and node topology constraints, aggregate traffic throughput, routing and forwarding information, L1/L2 cache sizes, clock frequency, available dram memory, etc.

Although the examples above discuss three layers nested within each other, any number of views and layers is consistent with the present disclosure. Similarly, parent views may add new information that is not encapsulated by the child views. These views may also be used to dynamically allocate resources to different virtual computers, as discussed in detail below.

Figure 5:
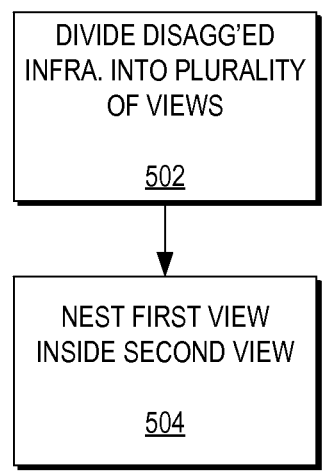
FIG. 5 is a flow diagram illustrating a method for nesting views according to an example embodiment of the present invention.

FIG. 5 depicts a general process for creating nested views in a disaggregated infrastructure.

A disaggregated infrastructure may be divided into a plurality of views (500), wherein the individual views describe components encapsulated by that view. For example, the disaggregated infrastructure may be substantially similar to the one shown in FIG. 2. Three views could be created for each rack 200. A first view may describe the utilization of individual compute resources, a second view may summarize available/consumed space on individual storage resources, and a third view may summarize available/consumed memory on available memory resources. In this manner, each view includes information describing the components encapsulated by that view.

A first view may be nested inside a second view (504), where the second view describes components encapsulated by both the first view and the second view. For example, a rack view may be created for each rack discussed in reference to block 502. The compute view, memory view, and storage view for each rack may be nested inside the rack view. OOR network connectivity information may also be included in the rack view. These rack views, in turn, may be nested inside a top level disaggregated infrastructure view. This disaggregated infrastructure view may therefore comprise information about the racks (from the rack view) and the individual components within the racks (from the compute view, memory view, and storage view). Additionally, new views may be created from the nested views. For example, a global compute view, global memory view, and global storage view may be created which describe all of the compute, memory, and storage resources in the system. This may be particularly helpful when allocating the disaggregated components to dynamically composed compute views because the management utility may quickly identify optimal resources.

Figure 6:
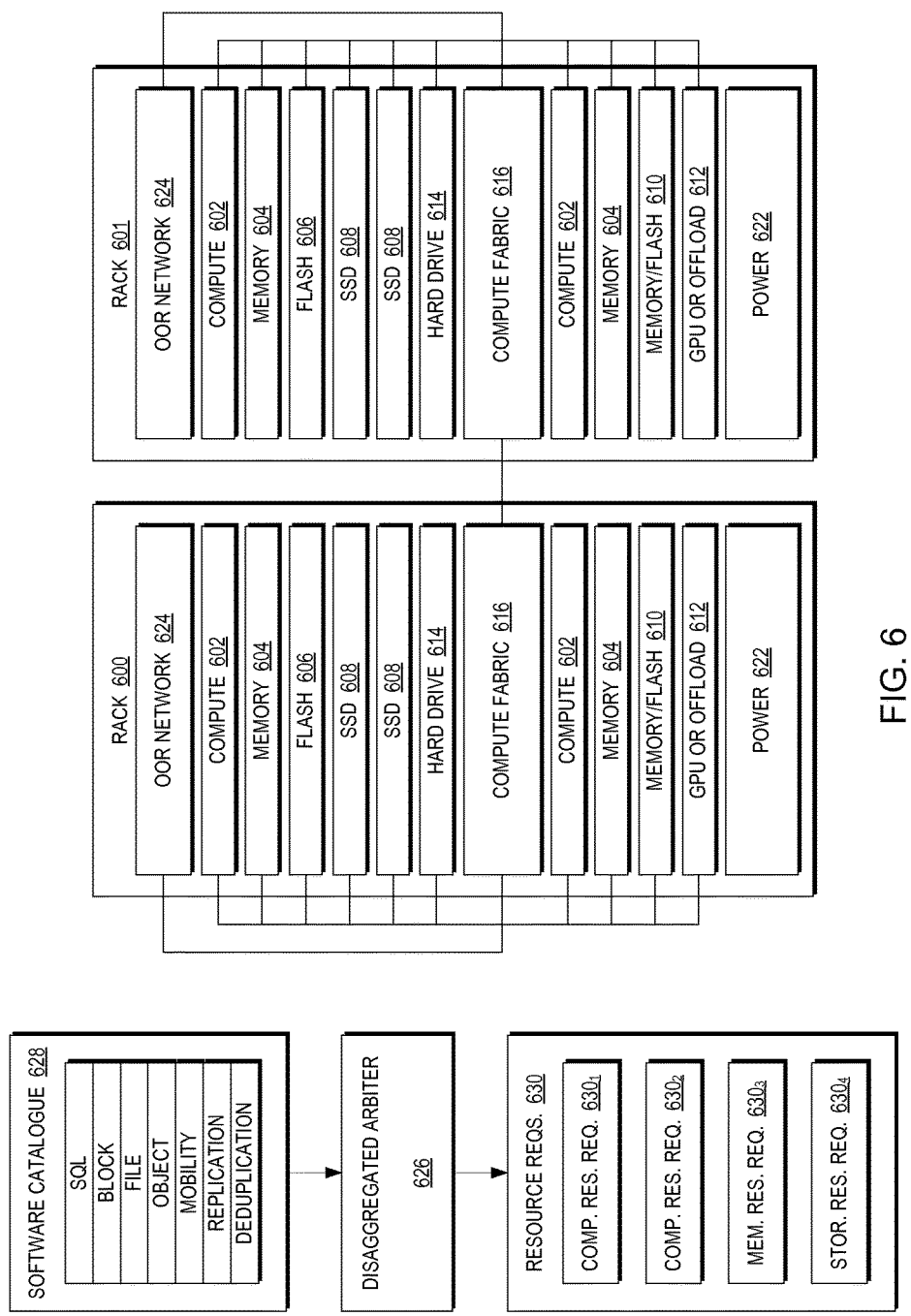
FIG. 6 is a block diagram illustrating an architecture of installing software on disaggregated hardware components according to an example embodiment of the present invention

FIG. 6 is a block diagram illustrating a system and process for overlaying application functionality on disaggregated components grouped into a dynamically composed compute node. FIG. 6 may include racks 600 and 601, which may be substantially similar to racks 200 discussed above. These racks may include disaggregated hardware components, such as compute 602, memory 604, flash 606, solid state drive 608, flash memory 610, and GPU 612. Each of the components may be in communication with compute fabric 616, thereby connecting the components both within and between racks. The communication with compute fabric 616 may be facilitated via physical interfaces, as discussed in reference to FIG. 2. Compute fabric 616 may also be in communication with out of rack network 624.

FIG. 6 also includes disaggregated arbiter 626 and software catalog 628. Disaggregated arbiter 626 may be a software application used to overly or install software applications on disaggregated hardware components that have been grouped into a DCCN. In an embodiment, disaggregated arbiter 626 is the management utility discussed above. Additionally or alternatively, disaggregated arbiter 626 may be a separate software entity that operates independently of the management utility.

Software catalog 628 may comprise various software offerings that may be installed on a dynamically composed compute node. The catalog may include operating systems, applications, hypervisors, or any other type of software application. For example, the software catalog may include multiple storage software offerings, such as SQL, block, file, or object based storage solutions, or data mobility, replication, or deduplication services. In some embodiments, disaggregated arbiter 626 may add software to and/or remove software from catalog 628.

In some embodiments, the disaggregated arbiter may receive a workload request identifying software to install on disaggregated hardware components. This software may be chosen from software catalog 628, and disaggregated arbiter 626 may identify compute resource requirements 1 and 2, memory resource requirement 3, and storage resource requirement 4. Available resources meeting these requirements may be identified in rack 600 or rack 601, and the software may be installed. Once installed, disaggregated arbiter 626 may start the applications or boot the operating systems, and expose them for use. This process is discussed in detail with reference to FIGS. 7-10.

Figure 7:
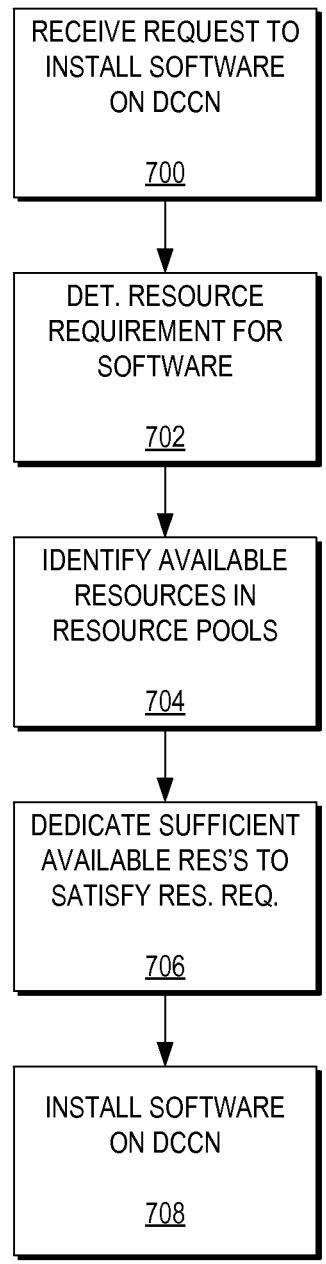
FIG. 7 is a flow diagram illustrating a method for installing software on disaggregated components according to an example embodiment of the present invention.

FIG. 7 is a flow diagram illustrating a method for installing a software application on a compute node comprising disaggregated hardware components is discussed. A request to install software on a DCCN may be received (700). In an embodiment, the request is similar to the workload request discussed above. The request may be received at the disaggregated arbiter, the management utility, and/or both.

Resource requirements for the software may be determined (702). These resource requirements could come from a software catalog, such as software catalog 628. Additionally or alternatively, they may be included in the request itself. In some embodiments, both minimum and optimal requirements may be identified. The disaggregated arbiter may then decide whether to use the minimum requirements, optimal requirements, or something in-between. This decision could be based, for example, on user or policy. These resource requirements may be, for example, compute requirements $630_1$, $630_2$, memory requirement $630_3$, and/or storage requirement $630_4$.

Available resources may be identified from resource pools (704). These resource pools may be substantially similar to those discussed above. In an embodiment, optimal resources may be identified from the resource pools. For example, if a software application requires 1 GB of memory, the memory resource pool may be queried to identify a memory resource that has a contiguous 1 GB chunk of memory. In some embodiments, this contiguous memory may be identified using the nested views discussed above.

A dynamically composed compute node may be created by dedicating sufficient resources to the compute node to satisfy the software instance's resource requirement (706). These resources may comprise any hardware component connected to the compute fabric, and may be on the same or different racks. For example, in FIG. 6 the compute node may be created by allocating memory from rack 601 for memory requirement $630_3$, and storage from rack 600 for storage requirement $630_4$. Compute resources may be allocated from both rack 600 and rack 601 for compute requirements $630_1$, $630_2$. This allows the dynamically composed compute node to be created from any available hardware components in the disaggregated infrastructure.

The software may be installed on the allocated resources in the DCCN (708). In other words, the software may be installed on the compute node created from the pooled resources. Once the software has been installed, the complete DCCN with overlaid application functionality may be presented to the requestor.

Figure 8:
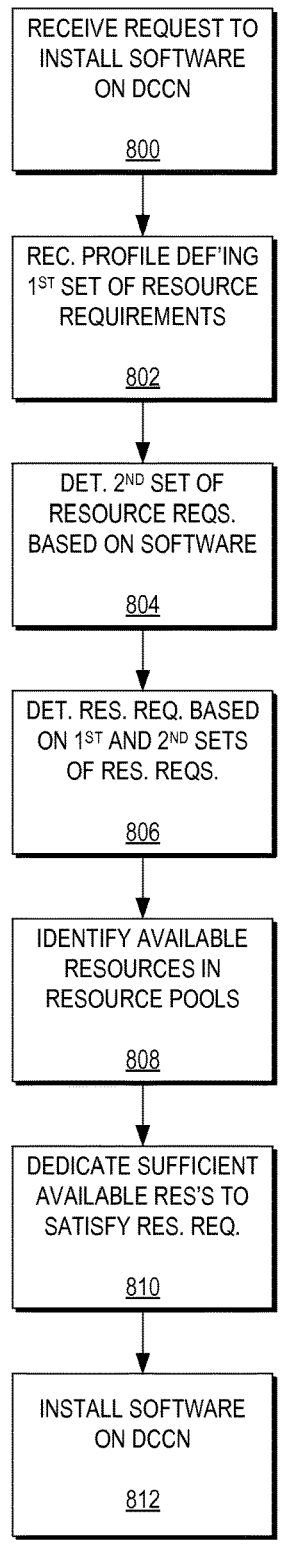
FIG. 8 is a flow diagram illustrating a method for determining resource requirements according to an example embodiment of the present invention.

FIG. 8 depicts a process for determining resources to allocate to a dynamically composed compute node. A request to install software on a dynamically composed compute node may be received (800). This may be substantially similar to block 700 discussed above.

A profile defining a first set of resources may be received (802). This profile could be, for example, included in the request. In some embodiments the profile may include special resource requirements not otherwise considered by the disaggregated arbiter. For example, the profile may specify that all allocated memory must be in a contiguous block. Additionally or alternatively, the profile may specify minimum and/or maximum resource requirements to be applied, regardless of the software to be installed on the DCCN. The disaggregated arbiter may always accommodate the requirements defined in the profile, use best efforts to accommodate the requirements, or ignore the requirements.

A second set of requirements may be determined based on the software (804). For example, the minimum and/or optimal requirements required for the software to run may be identified.

The first set of resource requirements and the second set of resource requirements may be combined to determine the final resource requirements (806). For example, the received profile may specify that all memory must be contiguous and the requirements derived from the software may specify at least 2 GB of memory are required. The combined, final resource requirement would therefore be 2 GB of contiguous memory.

Available resources satisfying the requirements may be identified from the resource pools (808). If there are no available resources that satisfy the requirements, the disaggregated arbiter may raise an alert, use best efforts, or take other remedial actions.

The identified resources may be used to create the dynamically composed compute node, and at block 812 the software may be installed on the compute node (810).

Figure 9:
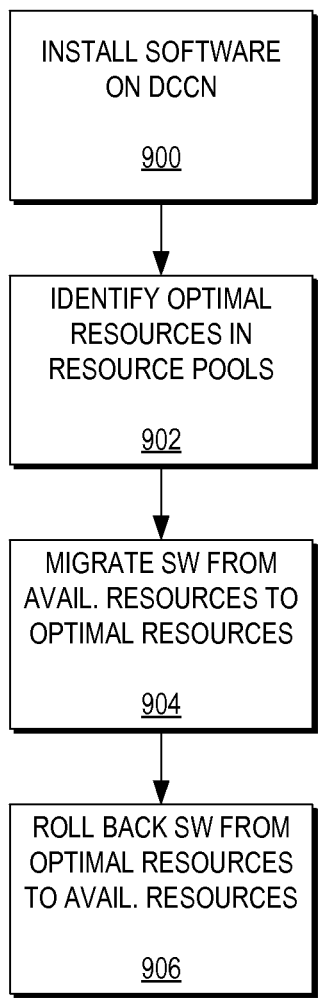
FIG. 9 is a flow diagram illustrating a method for migrating software according to an example embodiment of the present invention.

FIG. 9 is a flow diagram illustrating a method for migrating software between resources and rolling back changes. Software may be installed on a dynamically composed compute node using any of the methods discussed herein (900).

Optimal resources in the disaggregated infrastructure may be identified (902). For example, when the software was first installed it may have been allocated memory on different memory components spread throughout the disaggregated infrastructure. A contiguous block of memory may be identified. This memory may not have been available at the time the DCCN was created, and/or may have been recently added to the disaggregated infrastructure. In some embodiments, optimal resources may be identified as the result of a hardware failure. For example, if one of the originally allocated hardware components fails, a new, optimal resource may be identified.

The software may be migrated to the newly identified optimal resources (904). This could be accomplished, for example, by allocating the new resources to the DCCN and then de-allocating the old resources. The disaggregated arbiter, the management utility, or both may manage this migration process.

The software may be rolled back from the optimal resource to the original resources (906). This could occur, for example, if there was an error in the migration operation or if one of the new hardware components fails. In some embodiments, new optimal resources may be identified and the software may be migrated to those new optimal resources rather than rolling back to the original hardware.

Figure 10:
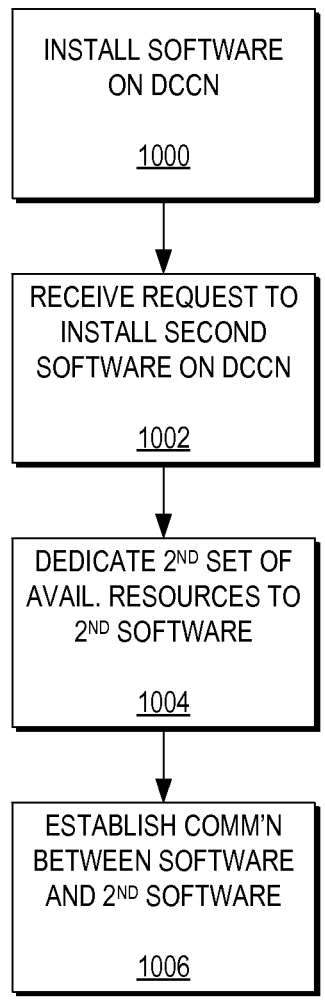
FIG. 10 depicts is a flow diagram illustrating a method establishing communication between two software solutions according to an example embodiment of the present invention.

FIG. 10 is a flow diagram illustrating a method for connecting multiple software instances. These instances may be connected together to form, for example, a virtual datacenter. Similarly, the software instances may be designed to interact with one another, such as an application server, web server, and database.

A first software instance may be installed on a dynamically composed compute node (1000). This first software instance may be installed using any of the methods discussed herein.

A request may be received to install a second software instance (1002). This second software instance may be designed to communicate and provide functionality in combination with the first software instance. For example, the first software instance may be a web server and the second software instance may be an application server.

A second set of resources may be dedicated to the second software instance (1004). These resources may be identified, allocated, and/or dedicated in any manner discussed in the present application.

A communication may be established between the two software instances (1006). This communication may be established, for example, over the compute fabric or a network.

Disaggregated Overlays Via App Service Profiles

As described above, fabric-based information technology (IT) infrastructures have disaggregated components (e.g., CPUs, memory, network, and storage) grouped into enclosures. According to example embodiments of the present invention, a disaggregated arbiter may carve resources from these enclosures (i.e., from the disaggregated components) to form a disaggregated subset. The arbiter then may overlay functionality, such as operating systems and applications, on top of this carved-out resource. Example embodiments of the present invention allow for automation on top of a disaggregated arbiter based on business and/or application patterns.

Although the disaggregated arbiter (DA) has the ability to place workloads, applications, OS, etc. in response to a higher-level command instructing it to do so, as described above, there is a possibility that the DA places this workload on an infrastructure that is inappropriate for the business needs of that application. For example, first, because there is no way to communicate to the DA that a workload is mission critical, business essential, or simply operational from the business point of view, the DA may place the workload on an incorrect subset of a disaggregated infrastructure, resulting in business increased risk, over-payment, or both. Second, because there is no way to communicate to the DA to what part of the business value chain to which the application belongs (e.g., Marketing & Sales, Service, Inbound Logistics, Outbound Logistics, or Internal Operations), this can also cause the DA to place the workload on the wrong (i.e., less than optimal) infrastructure. Third, because there is no way to communicate to the DA what other workloads belong to the same area of the business value chain, this can cause the DA to potentially assign the workload to resources that are not optimally adjacent to other similar workloads. Fourth, because there is no way to communicate to the DA the relation of a given workload to the multitude of applications that make up business steps and business scenarios, the DA may not effectively overlay the workload onto the infrastructure in an optimal fashion that understands the workload's place and relation to other workloads from the same business function.

Figure 11:
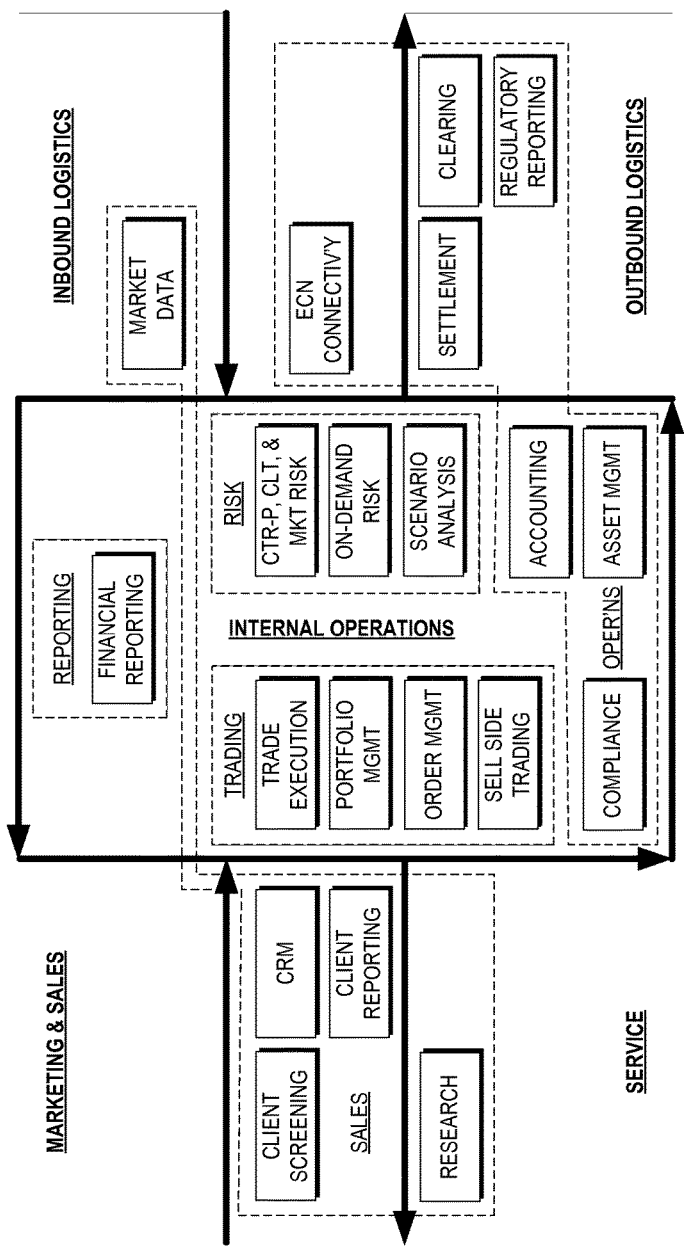
FIG. 11 is a block diagram illustrating business functions and business scenarios as links in a business value chain according to an example embodiment of the present invention.

FIG. 11 is a block diagram illustrating business functions and business scenarios as links in a business value chain according to an example embodiment of the present invention. As illustrated in FIG. 11, a plurality of applications (represented by boxes) may be associated with the five elements of the business value chain (represented by arrows) (e.g., marketing and sales, service, internal operations, inbound logistics, and outbound logistics).

Notably, a business value chain and the business functions within a business value chain usually span multiple stakeholders. Each business function has a primary set of stakeholders with specific business objectives. The fulfillment of a stakeholder objective represents a business scenario. Business scenarios can be identified by first identifying each stakeholder in a business function, and, thereafter, for each stakeholder, identifying each objective that that stakeholder has in that business function. Any specific requirements for meeting a stakeholder's objective should be identified so as to be included in a service level agreement (described hereinbelow).

Each stakeholder-objective combination for a business function is the point of departure for a business scenario. For each business scenario, a trigger event can be identified that initiates the scenario. A main sequence of interactions can then be described that represents the main scenario. Business exceptions can be captured as alternative flows through the scenario (i.e., as alternative scenarios). Each alternative scenario can be identified by describing each variation in the flow of events for the main scenario. Each alternative scenario can be described as a sequence of interactions.

An example of a business scenario is a business scenario for a car accident claim. The stakeholder in such a business scenario would be the claimant. The stakeholder's objective would be to get paid for his or her claim. A service level agreement (described in more detail hereinbelow) might specify that a stakeholder is to be paid within two weeks. The trigger for this scenario would be the submission of a claim by the claimant.

The main scenario would involve steps of the claimant submitting a claim with substantiating data, an insurance company verifying that claimant owns a valid policy, the insurance company assigning an agent to examine the case, the insurance company verifying all details are within policy guidelines, and the insurance company paying claimant and closing the file.

A first alternative scenario would encompass the situation where the submitted data from the first step was incomplete. This alternative scenario would include steps of the insurance company requesting missing information, and the claimant supplying the missing information.

A second alternative scenario would encompass the situation where the claimant does not own a valid policy. This alternative scenario would include the step of the insurance company denying the claim, notifying the claimant, and terminating the claim process.

A third alternative scenario would encompass the situation where no agent was available to examine the case. This alternative scenario would include the step of queuing the case for examination.

A fourth alternative scenario would encompass the situation where an accident associated with the claim violates basic policy guidelines. This alternative scenario would involve the insurance company declining the claim, notifying the claimant, and terminating the claim process.

A fifth alternative scenario would encompass the situation where an accident associated with the claim violates minor policy guidelines. This alternative scenario would involve the insurance company beginning negotiations with the claimant as to the degree of payment to be made.

Each business function in a business value chain comprises a series of business steps. Each business step involves a subset of stakeholders of the business function it is part of Business steps represent a process view of a business value chain. For example, a risk business function could be broken down into steps of calculating counterparty risk, generating counterparty reports, establishing a value of portfolios, calculating a value at risk for each portfolio, comparing the calculated value at risk to risk thresholds and compliance requirements, determining portfolio adjustments to reduce risk, generating portfolio adjustment reports, and generating overnight trades to rebalance portfolio risk. A use case describes functionality of a business step by expounding on part of a business scenario. Specifically, a business scenario is in essence a higher level expression of a use case that contains one or more business steps, and each of these business steps can be elaborated by one or more use cases.

For example, a "process trade" business step within a trade execution business scenario might include a "cancel a trade" use case. A use case is written to describe "what" a system or application must do to fulfill a user request. Use cases might have multiple steps (not to be confused with business steps), and each step can be characterized as having an actor, e.g. a user or a user's surrogate. A use case further has pre-conditions which must be fulfilled before the use case can start, as well as at least one post-condition, which can guarantee a certain outcome. An "e" flag can be utilized to determine whether an error occurs during execution of a use case. A use case can be composite, where each step in a higher level use case can be decomposed into separate multi-step use cases.

With respect to the exemplary "cancel a trade" use case, the actor for this use case would be a trader. The goal of this use case would be to reverse a prior trade prior to execution. The triggering event for this use case would be that the trader decides that the trade is no longer favorable. The frequency/repetition/concurrency of this trade would be once per day. A main flow of events for this use case would include steps of a trader checking that the trade has no prior fills, the system confirming no prior fill, the trader issuing a trade cancellation, the system removing the trade from an order book, and the trader receiving confirmation of the trade cancellation. The pre-conditions for this use case would require an initial state of the trade being unfulfilled and authentication by the trader. The post-conditions for this use case would specify that the trade is canceled and that the trade is subsequently historical for data integrity purposes. This use case would include constraints on performance (e.g., a check for prior fills must execute within half a second and removal from order book must complete within one second), reliability (e.g., a cancel trade transaction must be recovered if the system fails after confirming no prior fill), security (e.g., it is only possible for a trader to cancel trades belonging to the trader), and business rules (e.g., trade cancellation of a trade cannot be completed if the trade is filled prior to completion, and concurrent trade execution fails after a trader issues a trade cancellation). In an alternative flow of events, the trader discovers that a trade has already been filled and abandons the cancel trade attempt, or the trader discovers that a trade has been partially filled and issues cancellation of an unfulfilled balance of the trade.

A business application processes one or more business products defined by business steps and is responsible for one or more application use cases. Such a business application is executed by an application subsystem composed of one or more assemblies of infrastructure capabilities configured to optimize a certain workload profile. These assemblies can be characterized as ensembles. These relationships are illustrated in FIG. 11, together with relationships of other conceptualizations described herein in accordance with some preferred systems and methodologies.

Notably, a business value chain and the business functions within a business value chain usually span multiple business applications. Similarly, business scenarios may transcend applications. A business step, in contrast, typically involves a primary application in combination with secondary applications from adjacent business steps. A use case is specified in a manner similar to a scenario, but corresponds to only a single business application. Business steps can be organized around common business activities that combine related business steps. Thus, business activities represent an organizational sub-grouping within a business function. For example, FIG. 11 illustrates exemplary business activities that underpin a straight through processing capital markets business value chain.

Figure 12:
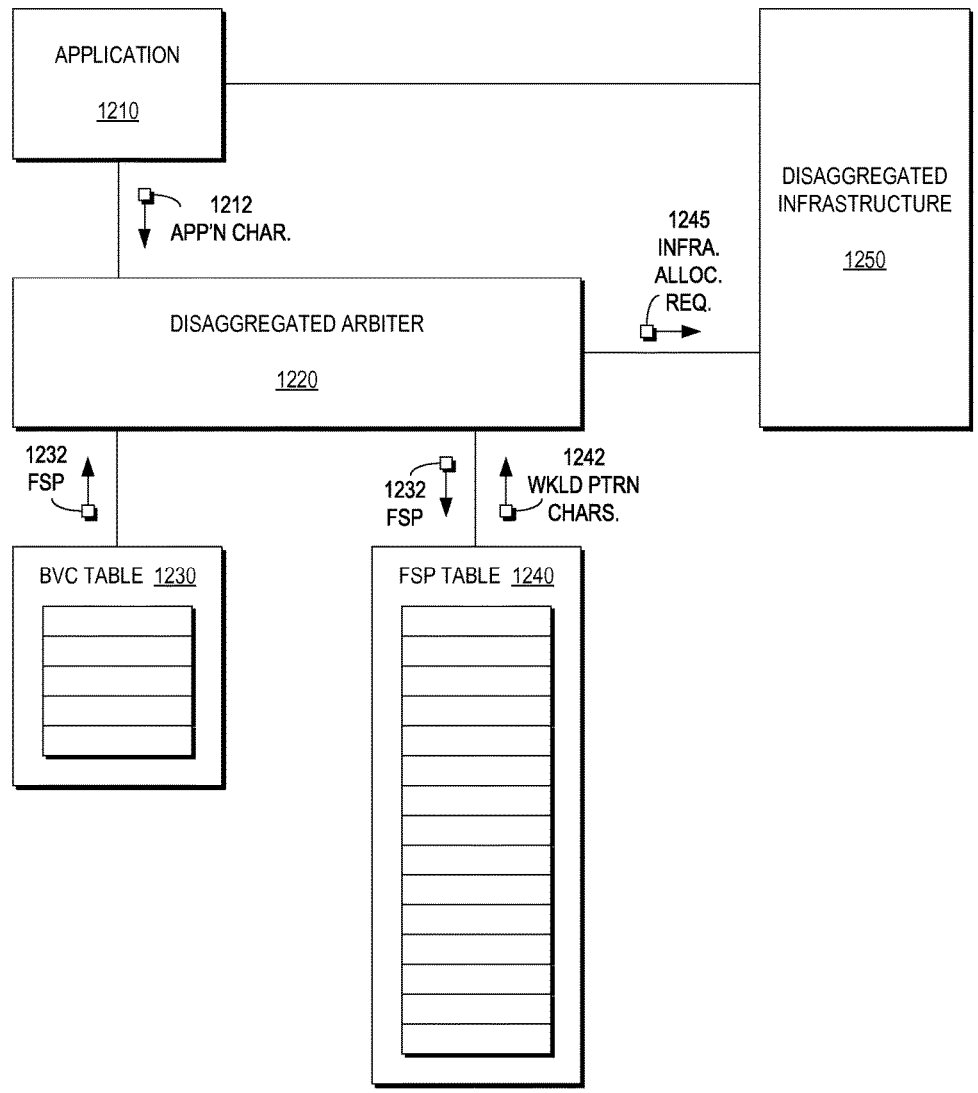
FIG. 12 is a block diagram illustrating determining an infrastructure allocation request according to a business value chain function according to an example embodiment of the present invention.

FIG. 12 is a block diagram illustrating determining an infrastructure allocation request according to a business value chain function according to an example embodiment of the present invention. FIGS. 15 and 16A-16D are flow diagrams illustrating methods for determining an infrastructure allocation request according to a business value chain function according to an example embodiment of the present invention. FIGS. 12, 15, and 16A-16D may be described in conjunction.

As illustrated in FIG. 12, an application 1210 may be scheduled to be dynamically placed onto a disaggregated infrastructure that does not have a location ready to place it. The application 1210 may have one or more of (a) a description of where it falls into a business value chain, and (b) what functional service profiles the application is composed of (e.g., message bus, content management repository, etc.).

In an example embodiment of the present invention, by passing down the location of the application 1210 in the business value chain, the DA 1220 has a much better shot at placing the application 1210 in the right place because it understands the general, underlying IT information cycle that the application 1210 must live on, and can "carve out" the appropriate compute elements that are associated with that IT information cycle.

In other example embodiments of the present invention, by passing down the location of the application 1210 in the business value chain, the DA 1220 can keep track of all applications 1210 associated with that location in the BVC, and therefore inform the business how much of the disaggregated resource (and potentially cost) is associated with that part of the business.

In further example embodiments of the present invention, the DA 1220 can keep track of quotas of how much of the disaggregated infrastructure can be dedicated to different areas of the business, and notify those areas when the allocation nears or reaches the quota limit.

In still other example embodiments of the present invention, by informing the DA 1220 of the entire business scenario of which this application 1210 is a part, the DA 1220 can then optimally position the workload in a disaggregated slice so as to communicate more efficiently and effectively with other workloads belonging to the same scenario.

In yet another example embodiment of the present invention, by informing the DA 1220 of the specific components (e.g., message gateway) that make up the application 1210, the DA 1220 can perform extremely granular allocation of disaggregated components and overlay the workload on a best-fit slice.

Figure 15:
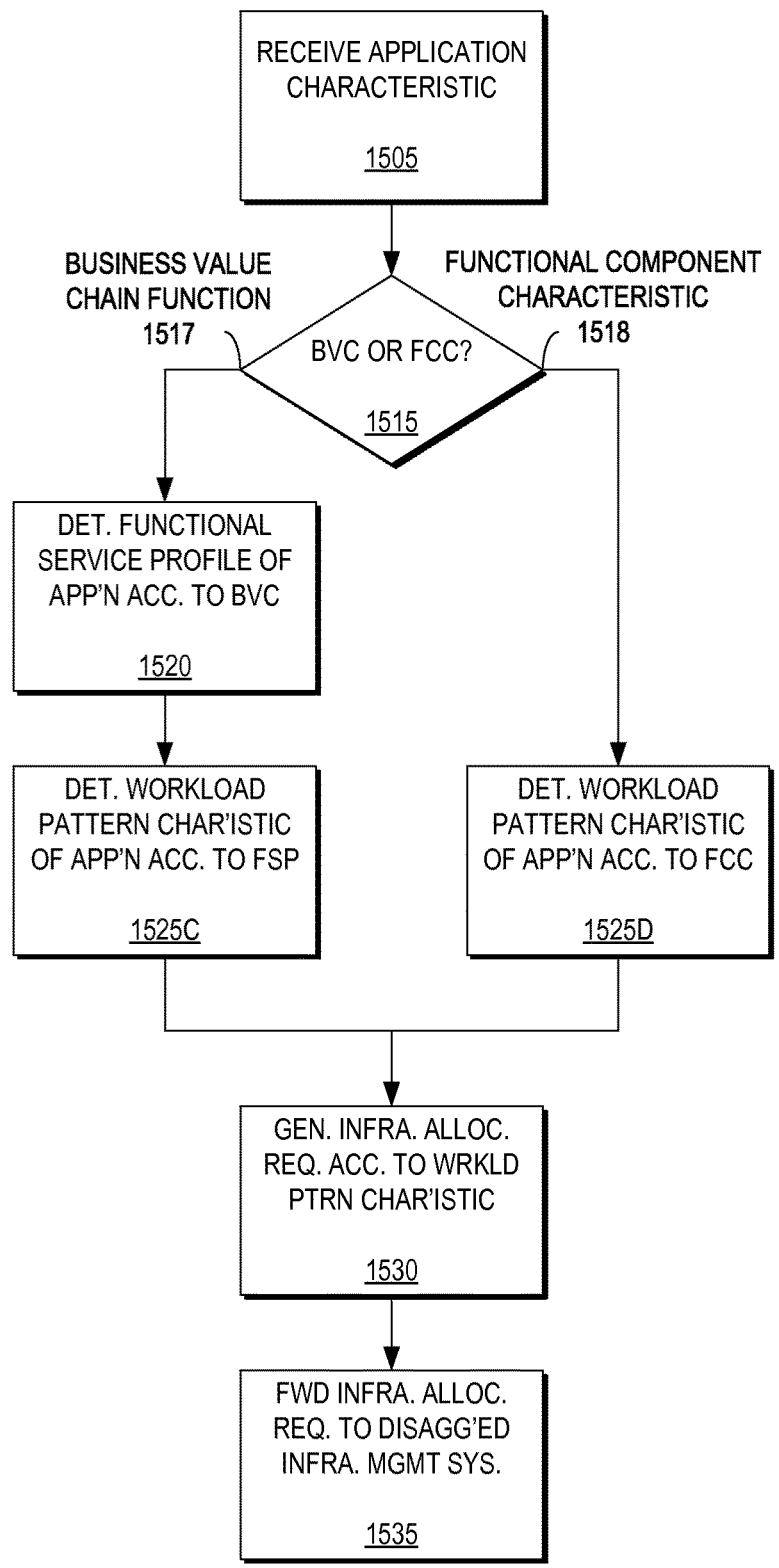
FIGS. 15 and 16A-16D are flow diagrams illustrating methods for determining an infrastructure allocation request according to an business value chain function according to an example embodiment of the present invention.
Figure 16:
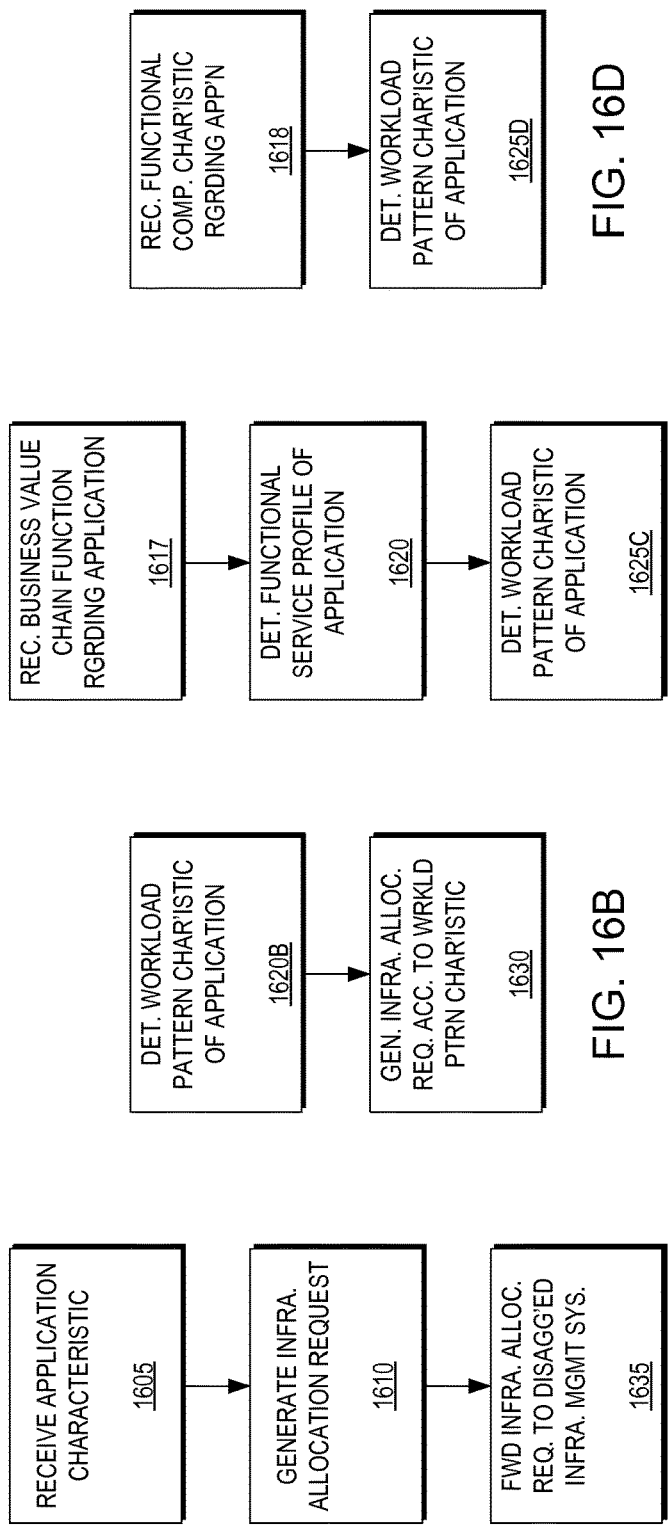

As illustrated in FIGS. 12, 15, and 16A, the DA 1220 may receive an application characteristic 1212 (1505) (1605), generate an infrastructure allocation request 1245 according to the application characteristic 1212 (1530) (1630), and forward the infrastructure allocation request 1245 to a management system associated with a disaggregated infrastructure 1250 (1535) (1635).

As illustrated in FIGS. 12, 15, and 16B, the DA 1220 may generate the infrastructure allocation request 1245 by determining a workload pattern characteristic 1242 of the application according to the application characteristic 1212 (1620B) and then generating the infrastructure allocation request 1245 according to the workload pattern characteristic 1242 of the application (1530) (1630).

FIG. 13 is a table illustrating functional service profiles according to an example embodiment of the present invention. In certain embodiments, as illustrated in FIG. 13, the FSP table includes entries for particular functional pattern components and provides various attributes and their values. As illustrated in FIG. 13, the functional service profile includes a MESSAGE GATWAY functional pattern component having a plurality of "unit of work" attributes (e.g., appearance, apportionment across instances) having any of a number of values (e.g., low, medium, high), a plurality of "unit of work effect on . . . " attributes (e.g., CPU, memory, disk I/O, network I/O) having any of a number of values (e.g., low, medium, high), and a plurality of "variability of usage on . . . " attributes (e.g., CPU, memory, disk I/O, network I/O) having any of a number of values (e.g., static, fluctuating).

FIG. 14 is a table illustrating workload pattern characteristics for business value chain links according to an example embodiment of the present invention. As illustrated in FIG. 14, the BVC table includes entries that point to the multiple FSP entries that usually are required for an application on that part of the business value chain.

In certain embodiments, as illustrated in FIG. 15, the application characteristic 1212 may be a business value chain function 1517 or a more granular functional component characteristic 1518 that maps directly to the FSP table, which bypasses the need to go to the BVC table, as will be discussed in greater detail below. Therefore, the DA 1220 may determine whether the application characteristic 1212 is a business value chain function 1517 or a functional component characteristic 1518 (1515).

In some embodiments, as illustrated in FIGS. 12, 15, and 16C, the DA 1220 may receive a business value chain function regarding the application (1517) (1617). If the application characteristic 1212 is a business value chain function, in order to determine the workload pattern characteristic 1242, the DA 1220 may determine a functional service profile (FSP) 1232 of the application characteristic according to the business value chain (BVC) function via the BVC table 1230 (1520) (1620). In other words, in certain embodiments, the DA 1220 may look up the FSP 1232 of the BVC function 1512 in the BVC table 1230 (i.e., discover which DSPs make up a typical application that runs on that element of the BVC) by mapping the BVC characteristic 1212 regarding the application to the FSP 1232 of the application. The DA 1220 then may determine the workload pattern characteristic 1242 of the application according to the FSP 1232 of the application (1525C) (1625C). In other words, in certain embodiments, the DA 1220 may look up the workload pattern characteristics 1242 in the FSP table 1240 by mapping the FSP 1232 of the application to the workload pattern characteristic 1242 of the application (i.e., the DA 1220 may use the elements of the FSP components to discover the CPU, memory, network, and storage demand that these components would place on an IT infrastructure).

In other embodiments, as illustrated in FIGS. 12, 15, and 16D, the DA 1220 may receive a functional component characteristic of the application (1518) (1618). If the application characteristic 1212 is a functional component characteristic regarding the application, in order to determine the workload pattern characteristic 1242, the DA 1220 may determine the workload pattern characteristic 1242 of the application according to the functional component characteristic regarding the application (1525D) (1625D). In other words, in certain embodiments, the DA 1220 may look up the workload pattern characteristics 1242 in the FSP table 1240 by mapping the functional component characteristic regarding the application 1518 of the application to the workload pattern characteristic 1242 of the application (i.e., the DA 1220 may use the elements of the FSP components to discover the CPU, memory, network, and storage demand that these components would place on an IT infrastructure).

As illustrated in FIGS. 12, 15, 16A, and 16B, the DA 1220 then may translate the demands into an appropriately-sized infrastructure allocation request 1245 to allocate disaggregated resources (e.g., CPU, memory, network, storage) from the disaggregated infrastructure. In other words, the DA 1220 may generate the infrastructure allocation request 1245 according to the workload pattern characteristic 1242 of the application (1530) (1630) and forward the infrastructure allocation request 1245 to the disaggregated infrastructure management system (1535) (1635).

The disaggregated infrastructure management system then may determine a resource requirement according to the infrastructure allocation request and allocate dedicated resources according to the resource requirement to a dynamically composed compute node from a pool of disaggregated hardware resources in communication with a compute fabric. Once the allocation has occurred, the application can then be placed onto the right-sized disaggregated infrastructure and begin operation.

Figure 17:
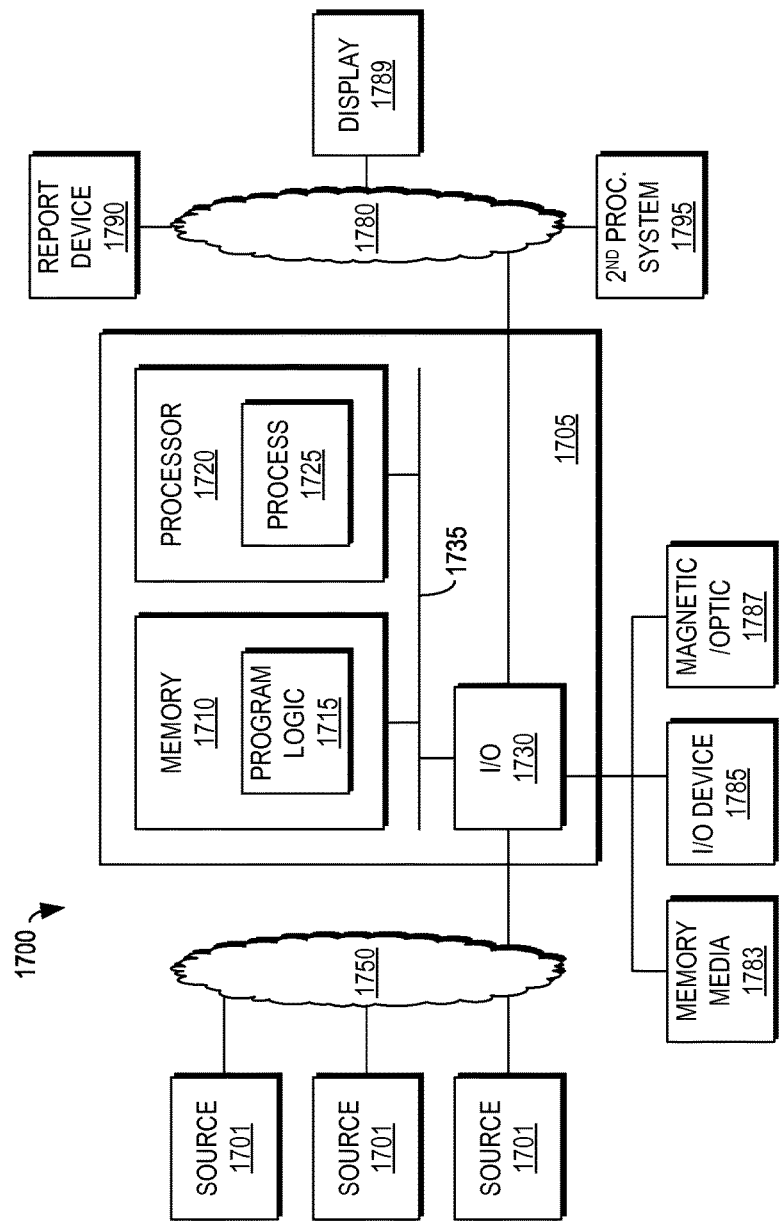
FIG. 17 is a block diagram illustrating an apparatus according to example embodiment of the present invention.

FIG. 17 is a block diagram of an example embodiment apparatus 1705 according to the present invention. The apparatus 1705 may be part of a system 1700 and includes memory 1710 storing program logic 1715, a processor 1720 for executing a process 1725, and a communications I/O interface 1730, connected via a bus 1735.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 17, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 18:
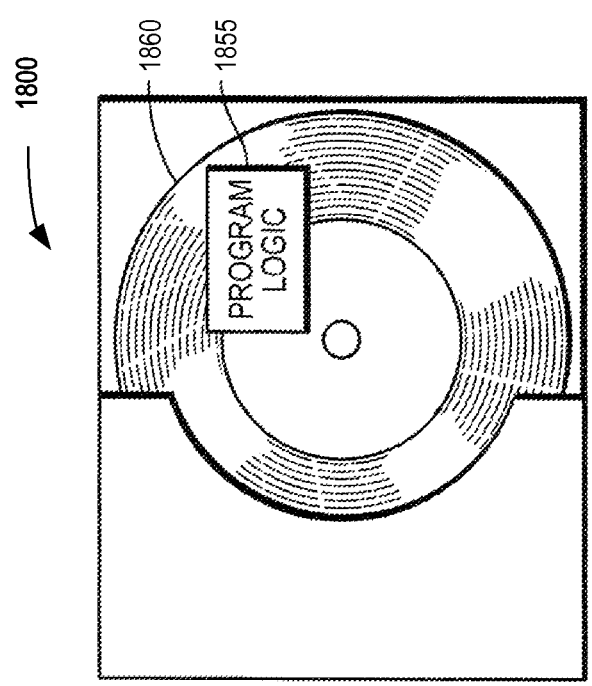
FIG. 18 is a block diagram illustrating computer program code according to an example embodiment of the present invention.

FIG. 18 shows program logic 1855 embodied on a computer-readable medium 1860 as shown, and wherein the logic 1855 is encoded in computer-executable code configured for carrying out the methods of this invention, thereby forming a computer program product 1800.

The logic for carrying out the method may be embodied as part of the aforementioned system, which is useful for carrying out a method described with reference to embodiments shown. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-implemented method to dynamically overlay application functionality on disaggregated components in a disaggregated infrastructure system comprising:

receiving, by a disaggregated arbiter, an application characteristic;

generating, by the disaggregated arbiter, an infrastructure allocation request according to the application characteristic, wherein the generating is based at least in part on (i) quotas of how much of the disaggregated infrastructure system can be dedicated to different workflows and (ii) one or more profiles; and forwarding, by the disaggregated arbiter, the infrastructure allocation request to a management system associated with the disaggregated infrastructure system;

wherein the infrastructure allocation request comprises resource requirements for dynamically overlaying application functionality for a given application on the disaggregated components in the disaggregated infrastructure system by allocating, from a pool of disaggregated hardware resources in communication with a compute fabric of the disaggregated infrastructure system, dedicated hardware resources to a dynamically composed compute node;

wherein the one or more profiles define a first set of resource requirements specified by a user that are independent of a second set of resource requirements specified by the given application; and wherein generating the infrastructure allocation request comprises:

generating a combined set of resource requirements based at least in part on the first set of resource requirements and the second set of resource requirements;

identifying one or more quotas for one or more workflow types associated with the given application;

determining relationships between the given application and one or more other applications having application functionality dynamically overlayed on the disaggregated components in the disaggregated infrastructure system; and determining a positioning of the given application within the disaggregated infrastructure system based at least in part on: comparison of available resources in the disaggregated infrastructure system relative to the identified quotas for the one or more workflow types associated with the given application and the combined set of resource requirements; and positioning of one or more other applications dynamically overlayed on the disaggregated components in the disaggregated infrastructure that are related to the given application.

2. The method of claim 1 wherein generating an infrastructure allocation request according to the application characteristic comprises:
determining a workload pattern characteristic of the given application according to the application characteristic; and
generating the infrastructure allocation request according to the workload pattern characteristic of the given application.

3. The method of claim 2 wherein:
receiving an application characteristic comprises receiving a business value chain function regarding the given application; and
determining a workload pattern characteristic of the given application according to the business value chain function regarding the given application comprises:
determining a functional service profile of the given application according to the business value chain characteristic regarding the given application; and
determining the workload pattern characteristic of the given application according to the functional service profile of the given application.

4. The method of claim 3 wherein:
determining a functional service profile of the given application according to the business value chain characteristic regarding the given application comprises mapping the business value chain characteristic regarding the given application to the functional service profile of the given application; and
determining the workload pattern characteristic of the given application according to the functional service profile of the given application comprises mapping the functional service profile of the given application to the workload pattern characteristic of the given application.

5. The method of claim 2 wherein:
receiving an application characteristic comprises receiving a functional component characteristic regarding the given application; and
determining a workload pattern characteristic of the given application according to the given application characteristic comprises determining the workload pattern characteristic of the given application according to the functional component characteristic regarding the given application.

6. The method of claim 5 wherein determining the workload pattern characteristic according to the functional component characteristic regarding the given application comprises mapping the functional component characteristic regarding the given application to the workload pattern characteristic.

7. The method of claim 1 wherein the pool of disaggregated hardware resources comprises one or more of a compute resource pool, a memory resource pool, a storage resource pool, and a network resource pool.

8. The method of claim 7 wherein the compute resource pool comprises compute resources, wherein the memory resource pool comprises memory resources, wherein the storage resource pool comprises storage resources, and wherein the network resource pool comprises network resources.

9. The method of claim 1 wherein the disaggregated infrastructure system comprises a plurality of hardware racks respectively comprising hardware components in communication through the compute fabric.

10. The method of claim 1 wherein determining the relationships between the given application and the one or more other applications having application functionality dynamically overlayed on the disaggregated components in the disaggregated infrastructure system comprises utilizing a value chain to determine information technology (IT) information cycles associated with the given application and each of the one or more other applications.

11. The method of claim 1 wherein determining the positioning of the given application within the disaggregated infrastructure system comprises selecting a positioning for the given application based at least in part on positioning of one or more other applications associated with a same IT information cycle.

12. A system to dynamically overlay application functionality on disaggregated components in a disaggregated infrastructure system comprising:
a disaggregated infrastructure system comprising a pool of disaggregated hardware resources in communication with a compute fabric;
a disaggregated arbiter having computer program code that when executed on a processor of a computer causes the computer to execute the operations of:
receiving an application characteristic;
generating an infrastructure allocation request according to the application characteristic, wherein the generating is based at least in part on (i) quotas of how much of the disaggregated infrastructure system can be dedicated to different workflows and (ii) one or more profiles; and
forwarding the infrastructure allocation request to a management system associated with the disaggregated infrastructure system;
wherein the infrastructure allocation request comprises resource requirements for dynamically overlaying application functionality for a given application on the disaggregated components in the disaggregated infrastructure system by allocating, from the pool of disaggregated hardware resources in communication with the compute fabric, dedicated hardware resources to a dynamically composed compute node;
wherein the one or more profiles define a first set of resource requirements specified by a user that are independent of a second set of resource requirements specified by the given application; and
wherein generating the infrastructure allocation request comprises:
generating a combined set of resource requirements based at least in part on the first set of resource requirements and the second set of resource requirements;
identifying one or more quotas for one or more workflow types associated with the given application;
determining relationships between the given application and one or more other applications having application functionality dynamically overlayed on the disaggregated components in the disaggregated infrastructure system; and
determining a positioning of the given application within the disaggregated infrastructure system based at least in part on: comparison of available resources in the disaggregated infrastructure system relative to the identified quotas for the one or more workflow types associated with the given application and the combined set of resource requirements; and positioning of one or more other applications dynamically overlayed on the disaggregated components in the disaggregated infrastructure that are related to the given application.

13. The system of claim 12 wherein generating an infrastructure allocation request according to the application characteristic comprises:
determining a workload pattern characteristic of the given application according to the application characteristic; and
generating the infrastructure allocation request according to the workload pattern characteristic of the given application.

14. The system of claim 13 wherein:
receiving an application characteristic comprises receiving a business value chain function regarding the given application; and
determining a workload pattern characteristic of the given application according to the business value chain function regarding the given application comprises:
determining a functional service profile of the given application according to the business value chain characteristic regarding the given application; and
determining the workload pattern characteristic of the given application according to the functional service profile of the given application.

15. The system of claim 14 wherein:
determining a functional service profile of the given application according to the business value chain characteristic regarding the given application comprises mapping the business value chain characteristic regarding the given application to the functional service profile of the given application; and
determining the workload pattern characteristic of the given application according to the functional service profile of the given application comprises mapping the functional service profile of the given application to the workload pattern characteristic of the given application.

16. The system of claim 13 wherein:
receiving an application characteristic comprises receiving a functional component characteristic regarding the given application; and
determining a workload pattern characteristic of the given application according to the application characteristic comprises determining the workload pattern characteristic of the given application according to the functional component characteristic regarding the given application.

17. The system of claim 16 wherein determining the workload pattern characteristic according to the functional component characteristic regarding the given application comprises mapping the functional component characteristic regarding the given application to the workload pattern characteristic.

18. The system of claim 12 wherein the pool of disaggregated hardware resources comprises one or more of a compute resource pool, a memory resource pool, a storage resource pool, and a network resource pool.

19. The system of claim 18 wherein the compute resource pool comprises compute resources, wherein the memory resource pool comprises memory resources, wherein the storage resource pool comprises storage resources, and wherein the network resource pool comprises network resources.

20. The system of claim 12 wherein the disaggregated infrastructure system comprises a plurality of hardware racks respectively comprising hardware components in communication through the compute fabric.

21. A computer program product including a non-transitory computer-readable storage medium having computer program code encoded thereon that when executed on a processor of a computer causes the computer to manage the dynamic overlaying of application functionality on disaggregated components in a disaggregated infrastructure system by executing operations of:
receiving an application characteristic;
generating an infrastructure allocation request according to the application characteristic, wherein the generating is based at least in part on (i) quotas of how much of the disaggregated infrastructure system can be dedicated to different workflows and (ii) one or more profiles; and
forwarding the infrastructure allocation request to a management system associated with the disaggregated infrastructure system;
wherein the infrastructure allocation request comprises resource requirements for dynamically overlaying application functionality for a given application on the disaggregated components in the disaggregated infrastructure system by allocating, from a pool of disaggregated hardware resources in communication with a compute fabric of the disaggregated infrastructure system, dedicated hardware resources to a dynamically composed compute node;
wherein the one or more profiles define a first set of resource requirements specified by a user that are independent of a second set of resource requirements specified by the given application; and
wherein generating the infrastructure allocation request comprises:
generating a combined set of resource requirements based at least in part on the first set of resource requirements and the second set of resource requirements;
identifying one or more quotas for one or more workflow types associated with the given application;
determining relationships between the given application and one or more other applications having application functionality dynamically overlayed on the disaggregated components in the disaggregated infrastructure system; and
determining a positioning of the given application within the disaggregated infrastructure system based at least in part on: comparison of available resources in the disaggregated infrastructure system relative to the identified quotas for the one or more workflow types associated with the given application and the combined set of resource requirements; and positioning of one or more other applications dynamically overlayed on the disaggregated components in the disaggregated infrastructure that are related to the given application.

* * * * *